(12) United States Patent
Hauer et al.

(10) Patent No.: US 11,964,824 B2
(45) Date of Patent: Apr. 23, 2024

(54) TRANSPORT DEVICE

(71) Applicant: B&R INDUSTRIAL AUTOMATION GMBH, Eggelsberg (AT)

(72) Inventors: Michael Hauer, Eggelsberg (AT); Stefan Flixeder, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 60 days.

(21) Appl. No.: 17/908,454

(22) PCT Filed: Mar. 3, 2021

(86) PCT No.: PCT/EP2021/055246
§ 371 (c)(1),
(2) Date: Aug. 31, 2022

(87) PCT Pub. No.: WO2021/175882
PCT Pub. Date: Sep. 10, 2021

(65) Prior Publication Data
US 2023/0174312 A1 Jun. 8, 2023

(30) Foreign Application Priority Data

Mar. 5, 2020 (AT) .............................. A 50169/2020

(51) Int. Cl.
*B65G 23/23* (2006.01)
*B65G 54/02* (2006.01)
*H02K 41/02* (2006.01)

(52) U.S. Cl.
CPC ............. *B65G 23/23* (2013.01); *B65G 54/02* (2013.01); *H02K 41/02* (2013.01); *H02K 2201/18* (2013.01)

(58) Field of Classification Search
CPC .... H02K 41/02; H02K 2201/18; B65G 23/23; B65G 54/02

(Continued)

(56) References Cited

U.S. PATENT DOCUMENTS 4,197,933 A * 4/1980 Dunstan .................. B66B 23/02
198/619
4,892,186 A * 1/1990 Frei ...................... B65G 47/082
198/867.13

(Continued)

FOREIGN PATENT DOCUMENTS

DE 10 2009 002612 10/2010
EP 0 782 966 7/1997

(Continued)

OTHER PUBLICATIONS

Jansen, "Magnetically levitated planar actuator with moving magnets: Electromechanical Analysis and Design," Eindhoven: Tech. Univ. of Eindhoven, DOI 10.6100/IR630846.

(Continued)

*Primary Examiner* — James R Bidwell
(74) *Attorney, Agent, or Firm* — GREENBLUM & BERNSTEIN, P.L.C.

(57) ABSTRACT

In order to at least temporarily increase the throughput of transported objects in a transport device in the form of a planar motor, without negatively influencing the movement of the transport units, at least one engagement portion is provided on each of the at least two transport units, it being possible for the at least two transport units to be moved in succession in the transport plane in a direction of movement into an engagement position in which the engagement portions of the transport units are at least partially engaged. The engagement portions are designed to overlap with one another in the engagement position at least in the direction of movement such that a total extent of the transport units in the direction of movement is smaller than a sum of the individual transport-unit extents of the transport in the direction of movement.

15 Claims, 6 Drawing Sheets

(58) Field of Classification Search
USPC .................................................. 198/619, 805
See application file for complete search history.

(56) References Cited

U.S. PATENT DOCUMENTS

| | | | |
|---|---|---|---|
| 9,202,719 | B2 | 12/2015 | Lu et al. |
| 9,617,019 | B2 * | 4/2017 | Smith .................. B65B 39/145 |
| 9,758,352 | B2 * | 9/2017 | Gonzalez Alemany ..................... B65G 17/22 |
| 9,828,192 | B2 | 11/2017 | Baechle et al. |
| 9,878,813 | B2 | 1/2018 | Eberhardt et al. |
| 11,772,912 | B2 * | 10/2023 | Flixeder ................. B65G 43/02 198/805 |
| 2008/0223697 | A1 | 9/2008 | van den Goor et al. |
| 2015/0041288 | A1 * | 2/2015 | van de Loecht ....... B65G 17/40 198/805 |
| 2020/0030995 | A1 | 1/2020 | Lu et al. |
| 2021/0039891 | A1 | 2/2021 | Andreoli |

FOREIGN PATENT DOCUMENTS

| | | | |
|---|---|---|---|
| EP | 1 882 986 | | 1/2008 |
| EP | 3 172 134 | | 8/2018 |
| EP | 3 172 156 | | 12/2018 |
| JP | 2-291384 | | 12/1990 |
| WO | 2005/019069 | | 3/2005 |
| WO | 2017/108423 | * | 6/2017 ............. B65G 54/02 |
| WO | 2018/176137 | | 10/2018 |
| WO | 2019/145406 | | 8/2019 |
| WO | 2012/175885 | * | 9/2021 ............. B65G 54/02 |

OTHER PUBLICATIONS

Austria Office Action conducted in counterpart Austria Appln. No. A50169/2020, dated Oct. 20, 2020.
Int'l Search Report (Form PCT/ISA/210) conducted in Int'l Appln. No. PCT/EP2021/055246, dated Jun. 4, 2021.
Int'l Written Opinion (Form PCT/ISA/237) conducted in Int'l Appln. No. PCT/EP2021/055246, dated Jun. 4, 2021.
Int'l Prelim. Exam. Report (Form PCT/ISA/409) conducted in Int'l Appln. No. PCT/EP2021/055246, dated Mar. 9, 2022.

* cited by examiner

TRANSPORT DEVICE

The invention relates to a transport device in the form of a planar motor comprising at least one transport segment which forms a transport plane and comprising at least two transport units which can be moved at least in two dimensions in the transport plane independently of one another, drive coils or movable permanent magnets being arranged on the transport segment and drive magnets being arranged on the transport units, or vice versa, the drive coils or the movable permanent magnets interacting magnetically with the drive magnets in order to move the transport units. The invention also relates to a transport unit for a transport device in the form of a planar motor and to a method for operating such a transport device.

Planar motors are known in principle in the prior art. A planar motor substantially has a transport plane which is usually formed of one or more transport segments and in which one or more transport units can be moved at least in two dimensions. A driving force acting on the transport units is generated by interaction of the magnetic fields of the transport segments and the transport units. In order to cause the transport unit to move in a specific direction of movement, at least one of the magnetic fields, i.e., that of the transport segment and/or of the transport unit, must be temporally variable in order to follow the movement of the transport unit. In most cases, however, only one magnetic field, usually that on the transport segment, is temporally variable and the other magnetic field, usually that on the transport units, is usually constant. For example, U.S. Pat. No. 9,202,719 B2 discloses the basic structure and mode of operation of such a planar motor.

Temporally variable magnetic fields can be generated, for example, by coils (electromagnets) or moving (e.g., rotating) permanent magnets that can be arranged both on the transport unit and on the transport segment. The coils are frequently also called drive coils. Temporally invariable, i.e., constant, magnetic fields are typically generated by means of permanent magnets. These components are frequently called drive magnets. Depending on the embodiment of the planar motor, these can also be arranged both on the transport unit and on the transport segment. Due to the simpler control, the drive coils are often arranged on the transport segment of the planar motor and the drive magnets are arranged on the transport unit.

The drive coils are usually controlled by a control unit in order to generate a moving magnetic field in the desired direction of movement. Drive magnets are distributed at least in two dimensions on the transport unit and interact with the moving magnetic field such that predetermined forces and moments can be exerted as desired on the transport unit in the direction of the degrees of freedom of movement of the transport unit (maximum three translational degrees of freedom of movement and three rotational degrees of freedom of movement). Forces and moments that cause the transport unit to move in the direction of one of the degrees of freedom of movement are usually referred to as driving forces. Forces and moments that are exerted by the transport segment on the transport unit and that serve to maintain the current state of motion are usually referred to as levitation forces. By means of the levitation force, for example, an air gap can be produced and maintained between the transport unit and the transport segments, and/or process forces or process moments can be compensated for. Even if the transport plane is not aligned horizontally, for example, the position of the transport unit can be kept constant by a corresponding levitation force.

In order to allow the transport unit to move in two dimensions, this movement being characteristic of the planar motor, two-dimensional interaction of the magnetic fields of the transport segments and the transport units is required, with one of the two magnetic fields needing to be temporally variable in at least two dimensions or the two magnetic fields needing to be temporally variable in at least one dimension. The drive coils and the drive magnets are advantageously arranged such that, in addition to a one-dimensional movement along the axes spanned by the transport plane, more complex two-dimensional movements of the transport unit in the transport plane are also possible. If the drive coils and the drive magnets are advantageously arranged such that the transport unit can be guided and moved in the direction of all six degrees of freedom with the aid of the drive and levitation forces, a mechanical guide can be omitted. This is often referred to as a bearingless planar motor.

A planar motor can be used, for example, as a transport device in a production process, it being possible for very flexible transport processes with complex movement profiles to be achieved. Such applications of a planar motor as a transport device are disclosed in EP 3 172 156 B1 and EP 3 172 134 B1, for example. WO 2018/176137 A1 discloses a transport device in the form of a planar motor, in which device transport units are firmly interconnected by means of relatively complex mechanical structures. The mechanical structure is used as a kind of handling apparatus. The handling apparatus is actuated by a relative movement of the transport units, for example in order to carry out a vertical lifting movement. The relative movement of the interconnected transport units is restricted by the mechanical connection, so that said units can no longer be moved individually.

In the previously known planar motors, the transport units can be moved in all six degrees of freedom of movement (translations in three spatial axes and rotations about the three spatial axes). In this case, two degrees of freedom (translation in the transport plane) are usually used as main directions of movement which allow substantially unrestricted movement. The remaining four directions of movement are only possible in a restricted manner (up to a certain amount of deflection). In previous planar motors, the two main directions of movement are regarded as equivalent, because the movement of the transport units is regarded as equally important in the two main directions of movement. This situation is also reflected in the design of the transport units. Known planar motors therefore usually use cuboid shuttles of the same size, the bases of which are square or rectangular. The transported objects are preferably arranged in or near the geometric center of gravity of the transport units in order to exert dynamic forces and moments that are the least disruptive possible on the transport unit during movement.

However, when transporting objects as part of production processes, there is usually a predetermined main process flow direction in which the transported objects are moved. For example, objects are moved between work stations in which specific process steps are performed on the transported object. This main process flow direction is therefore usually considered to have a higher priority. In addition, there can be subordinate secondary process flow directions, for example movement of objects within a work station or ejection of defective objects out of the main process flow direction, for example transversely thereto.

When transporting objects as part of production processes, it is usually desired that the greatest possible throughput of transported objects can be achieved in the main process flow direction at least in some sections. This requirement can also only be temporary (in a specific process section, e.g., processing station, section with lower speed). In order to increase the throughput of the transport process, the smallest possible distance between two transported objects in the product flow direction is therefore desired. However, the previous square design of the transport units is limiting because the minimum distance between two objects (when arranged in the center) substantially corresponds to the side length of the square transport unit if the transport units are directly mutually adjacent.

Transport units having a rectangular base, which have a shorter length when viewed in the direction of movement than in the transverse direction, can in principle reduce the object distance compared with square transport units. However, in this case there is a restriction in reducing the object distance, because the transport unit cannot and should not fall below a certain minimum length. The reason for this is that, in particular in dynamic movement sequences (e.g., with large accelerations or decelerations in the direction of movement) combined with a high center-of-gravity distance of the center of gravity of the transport unit in the vertical direction (in particular including an object transported thereby), relatively large pitching moments result, which need to be absorbed by the transport unit. In order to prevent the transport unit from tipping over, corresponding countermoments directed counter to these pitching moments therefore have to be generated by the planar motor. A certain lever distance from the center of gravity in the direction of movement is therefore required to generate these countermoments, which is why a certain minimum length is necessary.

It is therefore an object of the invention to at least temporarily increase, in a simple manner, the throughput of transported objects in a transport device in the form of a planar motor, without negatively influencing the movement of the transport units.

According to the invention, the object is achieved in that at least one engagement portion is provided on each of the at least two transport units, it being possible for the at least two transport units to be moved in succession in the transport plane in a direction of movement into an engagement position in which the engagement portions of the transport units are at least partially engaged, the engagement portions being designed to overlap with one another in the engagement position at least in the direction of movement such that a total extent of the transport units in the direction of movement is smaller than a sum of the individual transport-unit extents of the transport units in the direction of movement. As a result, the transport units can substantially be moved one into the other, so that the distance between two objects transported on said units can be reduced while having the same extent as with previously known transport units. In particular when using a plurality of transport units having engagement portions in an engagement position, the throughput can be increased compared with conventional transport units at least in some sections.

The engagement portions may also be designed to overlap with one another in the engagement position in a direction normal to the transport plane. As a result, for example, transport units having a rectangular base can also be used, the engagement portions of which lie partially one on top of the other.

The engagement portions are preferably of complementary design. As a result, the shapes complement one another and the transport units can, in the engagement position, be positioned very close to one another in a substantially form-fitting manner.

At least two engagement portions are preferably provided on at least one of the at least two transport units, the engagement portions preferably being arranged on opposite sides or on mutually adjacent sides of the relevant transport unit. The at least two engagement portions can be of similar or complementary design. As a result, flexibility can be increased because a plurality of transport units can be brought into an engagement position in succession. Complementary engagement portions on opposite sides are advantageous in order to bring a plurality of identically designed transport units into an engagement position in succession.

The at least two transport units preferably each have a base projected onto the transport plane with a rectangular area minimally surrounding the base, the minimally surrounding rectangular areas of the at least two transport units overlapping in the engagement position. A ratio between the minimally surrounding rectangular area and the base of each transport unit is preferably a maximum of two, more preferably a maximum of 1.5 and preferably a minimum of 1.1. This can ensure that a sufficiently large area is available for the arrangement of the drive magnets and that a sufficiently large engagement portion can nevertheless be formed.

The object is also achieved by a transport unit in that at least one engagement portion is provided on the transport unit, which engagement portion is designed to be at least partially engaged with an engagement portion of a further transport unit when the transport unit and the further transport unit are moved in succession in the transport plane in a direction of movement into an engagement position, the engagement portion of the transport unit being designed to overlap with the engagement portion of the further transport unit in the engagement position with the further transport unit at least in the direction of movement, such that a total extent of the transport units in the direction of movement is smaller than a sum of the individual extents of the transport units in the direction of movement.

The object is also achieved using a method, by the at least two transport units being moved in succession in the transport plane in a direction of movement in such a way that they overlap with one another at least in the direction of movement such that a total extent of the transport units in the direction of movement is smaller than a sum of the individual transport-unit extents of the transport units in the direction of movement. This method can also be used to move conventional transport units having a square base in an advantageous manner in the transport plane in order to increase the throughput of objects at least in some sections.

Advantageously, at least three transport units are moved in succession in the transport plane in the direction of movement in such a way that two successive transport units overlap with one another at least in the direction of movement such that a total extent of the transport units in the direction of movement is smaller than a sum of the individual transport-unit extents of the transport units in the direction of movement, each of the at least three transport units transporting an object, the objects being positioned on the transport units such that an average object distance between the objects in the direction of movement corresponds to at most the average transport-unit extent of the at least three transport units in the direction of movement, preferably at most two thirds of the average transport-unit extent. As a result, even with conventional transport units having a square or rectangular base, the throughput can be increased by placing the objects off-center on the transport units.

The transport units are preferably positioned relative to one another and the objects are arranged relative to the transport units such that the objects lie on a straight line in the direction of movement. This can be advantageous, for example, in order to maintain a constant distance between the objects and a work station. The present invention is described below in greater detail with reference to FIG. 1a to 6, which show advantageous embodiments of the invention by way of example in a schematic and non-limiting manner. In the drawings:

Figure 1A:
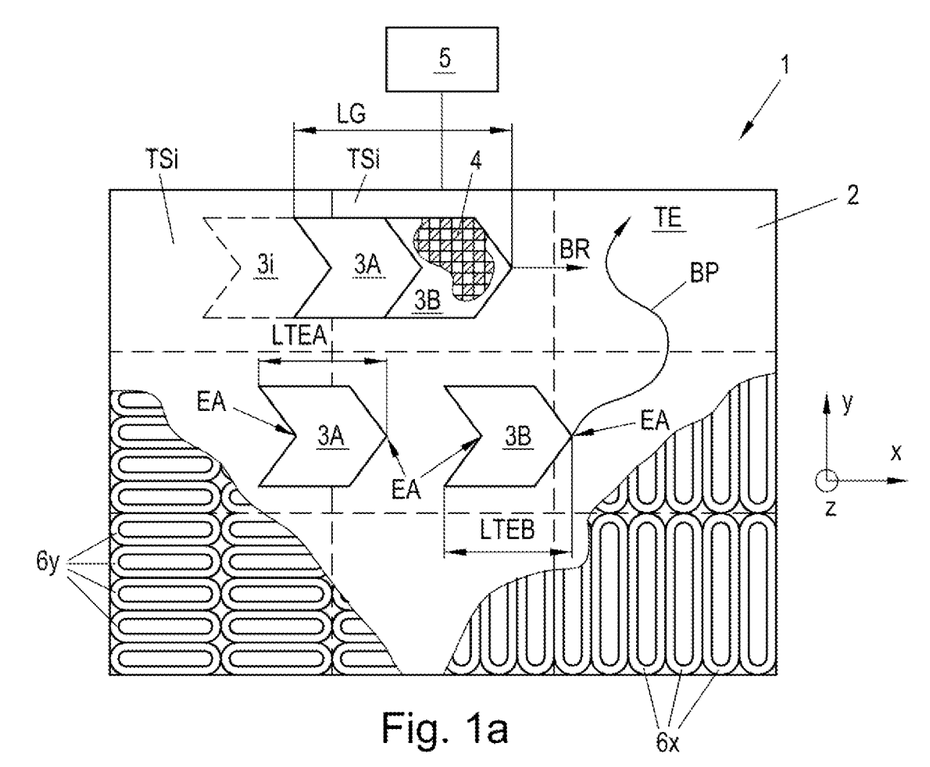
FIG. 1a and 1b show a transport device in plan view and in side view.
Figure 1B:
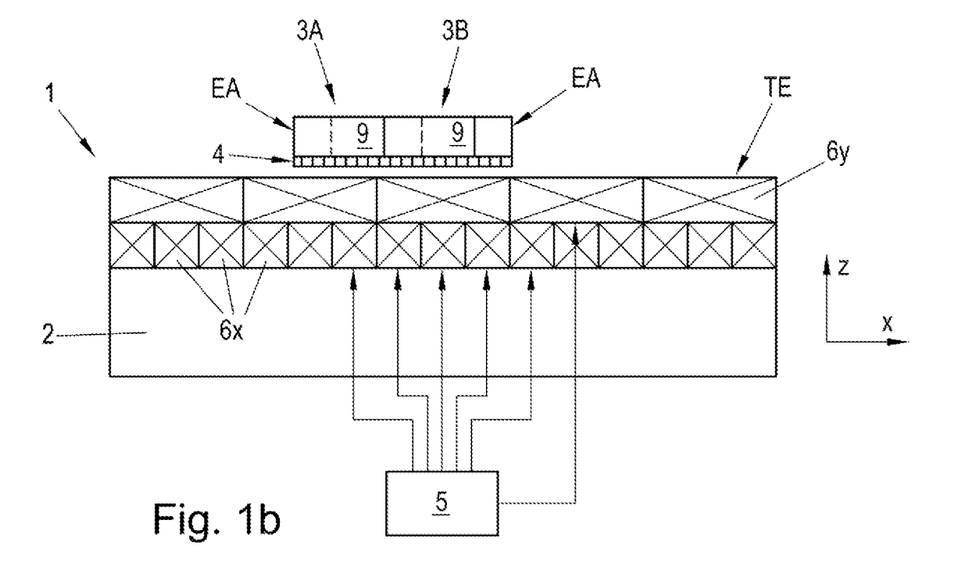

In FIG. 1a, an example embodiment of a transport device 1 according to the invention is shown in a plan view. FIG. 1b shows the transport device 1 of a front view. In the transport device 1, a stator 2 is provided which forms a transport plane TE. In the example shown, the transport plane TE is a horizontal plane having a vertical axis Z, a longitudinal axis X and a transverse axis Y. A different arrangement would of course also be possible, for example vertical or inclined at a specific angle. This depends substantially on the desired use of the transport device 1. The stator 2 is constructed here from a plurality i of transport segments TSi which are mutually adjacent in order to form the transport plane TE. As a result, a stator 2 can be constructed in a modular manner and transport planes TEi having areas of different sizes can be produced. Of course, this modular structure is only optional and a stator 2 could also be formed by just a single assembly. In the transport plane TE of the stator 2, one or more transport units (hereinafter generally provided with the reference sign 3) can be moved at least in two dimensions independently of one another. In the example shown, these are the transport units 3A, 3B. For example, a movement would only be possible in one axial direction along the longitudinal axis X or the transverse axis Y, or even a two-dimensional movement profile with a Y coordinate and an X coordinate, as indicated by the movement profile BP of the transport unit 3B. With a corresponding design of the transport device 1, the other four degrees of freedom of movement can also be used at least in a restricted manner, i.e., a translation in the direction of and a rotation about the vertical axis Z and a certain amount of rotation about the X and Y axes can also be used.

On the transport segments TSi, drive coils 6 are provided which are controlled by one (or more) planar motor control unit(s) 5 (hardware and/or software). For example, wound wire coils or PCB coils (PCB=printed circuit board) arranged on a printed circuit board are used as the drive coils 6. An electric current can be impressed into the drive coils 6 in order to generate a magnetic field. Power electronics that may be required for this can be arranged in the planar motor control unit 5 or on the stator 2 (e.g., on the transport segments TSi). A substantially moving magnetic field can be generated by appropriate control of drive coils 6 that are arranged side by side. The drive coils 6 are advantageously arranged on the stator 2 such that the magnetic field can extend in any directions in the transport plane TE in order to produce corresponding movement profiles of the transport units 3. The transport plane TE is not to be understood here as a plane in the mathematical sense but rather a flat transport surface which is delimited by the stator 2 and on which the transport units 3 can move. The drive coils 6 can be arranged on the stator 2 in one plane, e.g., in a plurality of coil groups each offset by 90° (see FIG. 2) or in a herringbone arrangement (see e.g.: Jansen, J. W., 2007. Magnetically levitated planar actuator with moving magnets. In: Electromechanical analysis and design, Eindhoven: Technical University of Eindhoven DOI: 10.6100/1R630846). However, the drive coils 6 can also be arranged in a plurality of planes lying one above the other, as will be explained below. Instead of the drive coils 6, however, movable permanent magnets (not shown) could also be provided on the transport segment(s) TSi in a known manner. In order to generate a temporally variable (moving) magnetic field, the permanent magnets can be controlled by the control unit 5 so that they are moved in a specific way. A detailed description is not given at this point.

On each of the transport units 3, drive magnets 4, for example permanent magnets, are arranged which interact with the drive coils 6 in order to exert a driving force on the transport unit 3. Depending on the control of the drive coils 6, a moving magnetic field is thus generated which interacts with the drive magnets 4 in order to move the transport unit 3. During operation, an air gap is provided between the drive coils 6 of the planar motor and the drive magnets 4 of a transport unit 3. In addition to the two-dimensional movement in the transport plane TE, a certain amount of movement of the transport units 3 in the vertical direction, i.e., normal to the transport plane TE, in this case in the Z direction, is also possible. The drive coils 6 therefore also bring about (levitation) forces in the Z direction. By appropriate control of the drive coils 6, the air gap can be increased and reduced to a limited extent, as a result of which the transport unit 3 can be moved in the vertical direction. The extent of the available range of movement in the vertical direction depends substantially on the structural design of the transport device 1, in particular on the maximum magnetic field that can be generated by the drive coils 6 and the drive magnets 4, as well as the mass and load of the transport unit (e.g., the weight of a transported object). Depending on the size and design of the transport device 1, the available movement range in the vertical direction can be, for example, in the range from a few mm to several centimeters. A rotational movement of the transport units 3A, 3B about the Z axis and, to a limited extent, about the Y and X axes is also possible.

In the example shown in FIG. 1a+1b, the drive coils 6 are arranged in two layers one above the other in the Z direction. In a first layer, drive coils 6y are oriented such that they can be used to generate forces on the transport unit 3 in the Y direction and the Z direction. In a second layer, the drive coils 6x are oriented such that they can be used to generate forces on the transport unit 3 in the X direction and the Z direction. The two layers extend substantially completely over the entire transport plane TE in order to form the largest possible movement range for the transport units 3. In the example shown, the first layer with the drive coils 6y is closer to the surface in the Z direction and thus closer to the transport units 3 than the second layer with the drive coils 6x, as can be seen in FIG. 1b. Of course, this is only by way of example and the arrangement could be reversed. The drive coils 6x and 6y also do not have to be aligned orthogonally to one another. One or more further layers of drive coils 6 could also be provided. Furthermore, the drive coils 6 of one layer can be arranged at any angle to the drive coils 6 in the adjacent layers. However, the drive coils 6 as a whole allow movement both in the X direction and in the V' direction. The drive coils 6 are preferably designed as so-called air coils without an iron core in order to reduce or prevent the permanent magnetic force of attraction between the transport units 3 and the transport segments TSi. As a result, the transport units 3 are attracted less strongly by the drive magnets 4 in the direction of the transport plane TE.

External storage of the transport units 3 can be dispensed with in the example shown. The transport units 3 levitate purely due to the magnetic (levitation) force generated by the drive magnets 4 of the transport unit 3 and the drive coils 6 of the transport segment TSi, which force acts here in the Z direction. However, the desired air gap between the drive coils 6 and the drive magnets 4 does not necessarily have to be generated or maintained purely magnetically, but rather the transport units 3 can also be mounted in any other way. Any suitable mechanisms can interact for this purpose, for example mechanical, magnetic, electromagnetic, pneumatic, etc. In the example shown, a planar motor control unit 5 is provided, by means of which the drive coils 6 of the stator 2 can be controlled. The planar motor control unit 5 can, for example, also be connected to a higher-level control unit (not shown), for example in order to jointly control and synchronize a plurality of transport devices 1. Of course, the planar motor control units 5 could also be integrated into the higher-level control unit. It can also be provided that a segment control unit (hardware and/or software) is provided for each transport segment TSi, or a group of transport segments TSi, and can also be integrated in a planar motor control unit 5 or higher-level control unit or can be in the form of a separate unit. The planar motor control unit 5 and/or the higher-level control unit can, for example, be connected to a user interface (not shown), for example a computer, via which the transport unit 3 can be controlled. The movement profiles of transport units 3 can be synchronized or coordinated with one another via the planar motor control unit 5 and/or the higher-level control unit, for example in order to avoid a collision of transport units 3 or objects transported thereby. A control program that implements the desired movement profiles of the transport units 3 runs on the planar motor control unit 5. The structure and mode of operation of a planar motor are, however, known in principle, which is why no detailed description is given at this point. At this point, it should be noted that the structure is only an example and can of course also be implemented in reverse. The drive coils 6 or the movable permanent magnets could therefore also be arranged on the transport units 3 and the drive magnets 4 could be arranged on the stator 2. In this case, an energy supply for controlling the drive coils 6 or the movable permanent magnets would be provided on the transport units 3. However, nothing changes in the basic mode of operation of the transport device.

The transport units 3 have a main body 9 having a specific base. On the underside, which faces the transport plane TE during operation, drive magnets 4 are arranged in a known manner. For example, an object O to be transported can be arranged on the opposite upper side of the main body 9. A basic distinction is made between the known 1D arrangement and the 2D arrangement of the drive magnets 4. In the 1D arrangement, the drive magnets 4 are divided into magnet groups, similarly to the drive coils 6 on the transport segment TSi. A specific number of elongate drive magnets 4 is provided in each magnet group, the drive magnets 4 being arranged side by side, and drive magnets 4 of different magnetic polarity or direction of magnetization alternating. The drive magnets 4 of one magnet group are oriented geometrically differently from the drive magnets 4 of the other magnet groups.

The known Halbach arrangement, in which the direction of magnetization of adjacent drive magnets 4 is rotated by 90° to one another, has also proven to be advantageous. In general, however, the directions of magnetization of adjacent drive magnets 4 within a magnet group can also be rotated by a different angle to one another, for example 45°. The Halbach arrangement has the advantage that the magnetic flux on one side of the magnet group (preferably on the side facing the transport plane TE) is greater than on the opposite side. A particularly advantageous, sinusoidal magnetic field image of the magnetic field of a magnet group can be achieved if the magnet width and magnet height of the individual drive magnets 4 in the magnet group are adjusted accordingly, e.g., if the outermost drive magnets 4 of the magnet group have a reduced magnet width, in particular half the magnet width, compared with the intermediate drive magnets 4 of the magnet group.

The drive magnets 4 of adjacent magnet groups are preferably at an angle of 90 degrees to one another. The magnet groups of one orientation can be provided, for example, for a movement of the transport unit 3 in the Y direction, by the respective magnet groups interacting with the drive coils 6y of the embodiment according to FIG. 1a+1b. The magnet groups having the other orientation can be provided in an analogous manner for a movement of the transport unit 3 in the X direction. For this purpose, the magnet groups can interact with the drive coils 6x of the embodiment according to FIG. 1a+1b. When the transport unit 3 is rotated by 90 degrees, the magnet groups interact with the drive coils of the other coil groups.

In the 2D arrangement, individual drive magnets 4 of different polarity or direction of magnetization are arranged in the manner of a chessboard, as indicated by the different hatching on the transport unit 3B in FIG. 1a. As a result, more flexible bases of the transport units 3 can be produced because the drive magnets 4 of the 2D arrangement can be grouped very flexibly. Of course, the 1D arrangement and the 2D arrangement shown are only to be understood as examples, and it is immediately apparent that there can be a large number of different options for the 1D arrangement and the 2D arrangement. However, the specific design of the drive magnets does not play a significant role for the invention either, which is why a more detailed description is omitted below.

According to the invention, at least two transport units 3A, 3B are provided in the transport device 1, at least one engagement portion EA being provided on each of the transport units 3A, 3B. Of course, further transport units 3i (not shown) can also be provided, on which at least one engagement portion EA is provided in an analogous manner. Of course, transport units 3i of any other design can also be additionally provided in the transport device 1. The at least two transport units 3A, 3B can be moved in succession in the transport plane TE in a direction of movement BR into an engagement position in which the engagement portions EA of the transport units 3A, 3B are at least partially engaged. The engagement position is shown in the upper region of FIG. 1a, the common direction of movement BR being the X direction here. Due to the possibility of movement of the transport units 3A, 3B in the transport plane TE at least in two dimensions, any other direction of movement BR in the transport plane TE would of course also be possible.

The engagement portions EA are designed such that they overlap with one another in the engagement position at least in the direction of movement BR such that a total extent LG of the transport units 3A, 3B in the direction of movement BR is smaller than a sum of the individual transport-unit extents LTEA, LTEB of the transport units 3A, 3B in the direction of movement BR. The transport-unit extent is to be understood as meaning the total length of a transport unit in the direction of movement BR. At least one engagement portion EA of a transport unit 3A is preferably designed to be complementary to at least one engagement portion EA of the other transport unit 3B. In the example shown, the right-hand engagement portion EA of the transport unit 3A is designed to be complementary to the left-hand engagement portion EA of the right-hand transport unit 3B. Complementary is to be understood here as meaning that the engagement portions EA are matching in design, so that they substantially complement one another, e.g., concave/convex or, as shown, in the form of an arrow-shaped projection and an arrow-shaped recess. Further alternatives are described in more detail below with reference to FIG. 2a-2g. As a result, the transport units 3A, 3B can be moved very close to one another in the engagement position, without there being a gap between the transport units 3A, 3B. The transport units 3A, 36 can thereby be moved one into the other in a substantially form-fitting manner.

Of course, the depiction is only to be understood as an example in order to illustrate the principle of the invention. Preferably, of course, more than two transport units 3A, 3B, . . . 3i can be moved in succession into an engagement position in an analogous manner, as indicated by dashed lines in FIG. 1a. As a result, the throughput of transported objects in the direction of movement BR can be increased compared with conventional transport units having a square base and the same transport-unit extent, because an average object distance between the transported objects is reduced in the direction of movement BR. The average object distance OAM can be found from $$OAM = \frac{\sum OAi}{n-1},$$

with the object distances OAi between the objects O of two transport units 3 arranged in succession and the number n of transport units 3 in the engagement position.

Figure 3A:
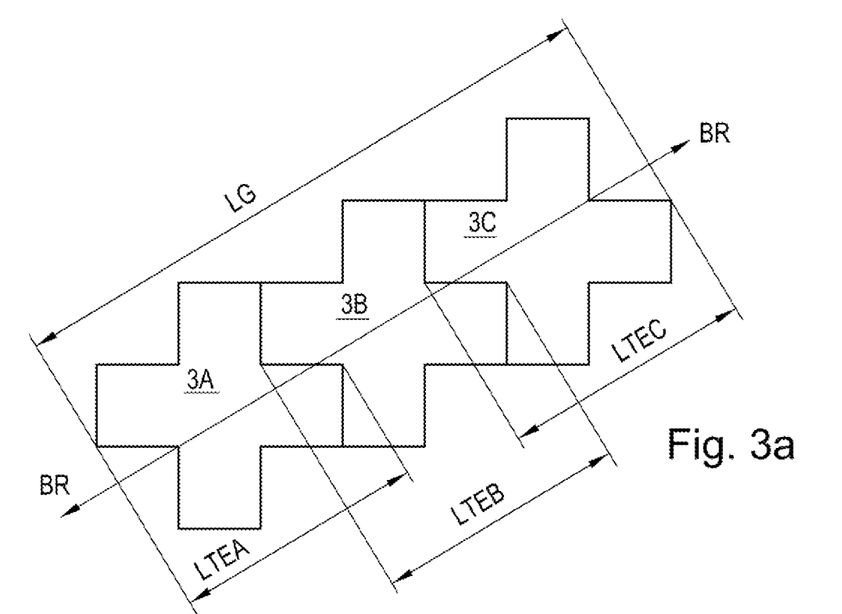
FIG. 3a+3b each show three transport units in two different engagement positions in plan view.

In the example shown in FIG. 1a, the transport units 3A, 3B partially overlap with one another in the direction of movement BR and completely overlap with one another in the direction normal to the direction of movement BR (here in the Y direction), such that the side edges of the transport units 3A, 3B are aligned. Of course, another type of overlapping would also be possible. For example, the complementary engagement portions EA could be designed such that, in the engagement position, they overlap with one another not only in the direction of movement BR but also in a direction normal to the transport plane, here in the Z direction, as shown in FIG. 3c. Alternatively or additionally, an offset engagement position would also be possible, for example if the complementary engagement portions EA are designed as shown in FIG. 3a+3b.

Figure 2A:
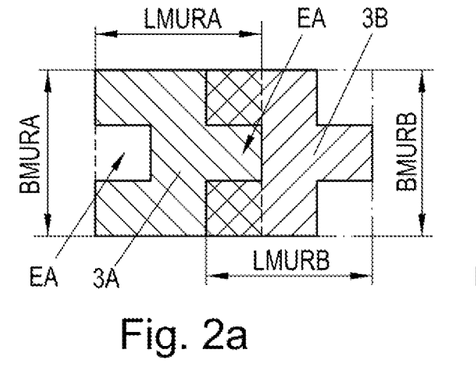
FIG. 2a-2g each show a pair of transport units having various engagement portions in an engagement position in plan view.
Figure 2B:
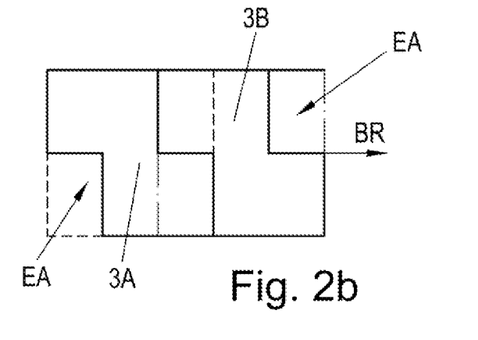
Figure 2C:
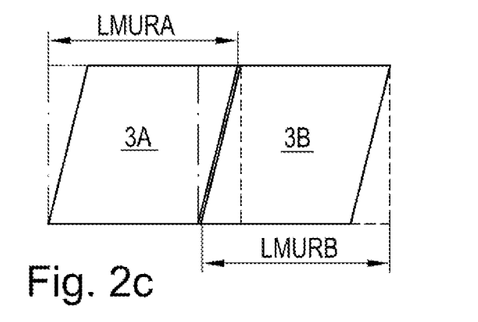
Figure 2D:
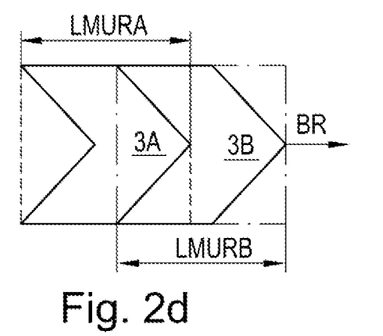
Figure 2E:
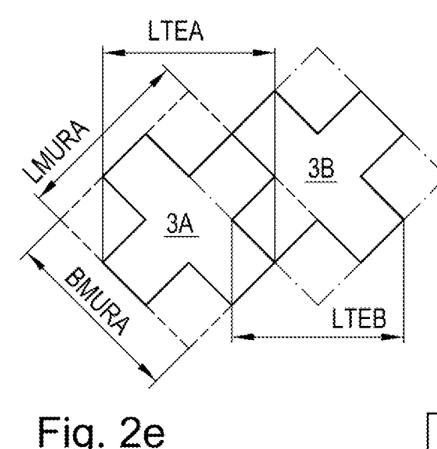
Figure 2F:
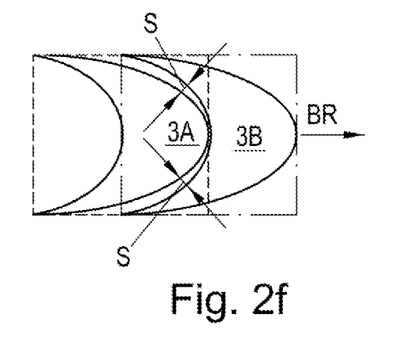
Figure 2G:
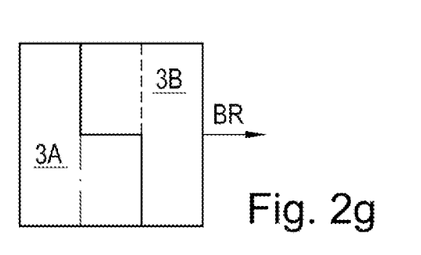

Only one engagement portion EA could be provided on the transport units 3A, 3B, e.g., as shown in FIG. 2g, but preferably a plurality of engagement portions EA are provided on a transport unit 3A, 36, for example two engagement portions EA on opposite sides of the relevant transport unit 3A, 3B, as in FIG. 1a and FIG. 2a-2f. This is advantageous in order to bring a plurality of transport units 3i in succession into the engagement position in the direction of movement BR, as is shown, for example, in FIG. 4. If a plurality of engagement portions EA are arranged on a transport unit 3A, these are preferably of complementary design, as is shown, for example, in FIG. 1a. As a result, identical transport units 3A, 3B can be used. If a plurality of engagement portions EA are provided on a transport unit 3A, 3B, these can also be arranged on mutually adjacent sides of the relevant transport unit 3A, 3B, for example so as to be offset by 90° to one another about the vertical axis, as is the case, for example, on the transport units 3A, 3B shown in FIG. 2e with a cross-shaped base. Due to their cross-shaped base, these transport units 3A, 3B each have an engagement portion EA on all four sides.

However, the engagement portions EA of a transport unit could also be of similar design and preferably of a design complementary to at least one engagement portion EA of another transport unit. For example, two arrow-shaped recesses (analogously to the transport units 3A, 3B in FIG. 1a on the right) could be arranged on opposite sides in the direction of movement BR on a transport unit 3A, and two arrow-shaped projections could be arranged accordingly on the transport unit 38 (analogously to the transport units 3A, 3B in FIG. 1a on the left) on opposite sides in the direction of movement BR. The transport units 3A, 3B can be brought into an engagement position in the same way as before, but the transport units 3A, 3B are not of identical design in this case. In an analogous manner, this can also be the case with engagement portions EA designed in any other way. Within the scope of the invention, similar engagement portions EA are understood to mean engagement portions EA which have a similar geometry and which are the same or different in size. For example, two arrow-shaped projections of different sizes can be arranged on a transport unit 3, which are therefore similar. In addition, if the arrow-shaped projections are also of the same size, they are not only similar but identical. The same naturally also applies to all other embodiments of engagement portions EA.

FIG. 2a-2g show examples of various embodiments of transport units 3A, 3B having various engagement portions EA, each in a plan view. The direction of movement BR extends in the direction of the X axis. The transport units 3A, 3B each have a base projected onto the transport plane TE, as indicated by way of example in FIG. 2a by the hatched area of the transport unit 3A. The base of each transport unit 3A, 3B can be circumscribed by a minimally surrounding rectangle. The minimally surrounding rectangle designates the smallest possible axis-parallel rectangle that encloses the base of the transport unit 3A, 3B. In FIG. 2a, the minimally surrounding rectangles of the two transport units 3A, 3B each have a length LMURA, LMURB in the X direction and a width BMURA, BMURB in the Y direction. In general, when two transport units are in the engagement position, the minimally surrounding rectangular areas of the two transport units 3A, 3B overlap, as indicated by the cross-hatching in FIG. 2a. The bases and the minimally surrounding rectangular areas are only drawn in detail in FIG. 2a. This is also representative of the other embodiments in FIG. 2b-2g, in which the minimally surrounding rectangular areas are only indicated in dashed or dash-dotted lines. A ratio between the minimally surrounding rectangular area (LMUR×BMUR) and the base of a transport unit 3A, 3B is preferably a maximum of two, more preferably a maximum of 1.5. This ensures that the available area for the arrangement of the drive magnets 4 is large enough to be able to generate sufficiently large drive and levitation forces. In addition, the ratio between the minimally surrounding rectangular area and the base of a transport unit 3A, 3B is preferably at least 1.1, particularly preferably at least 1.2, in order to be able to form a sufficiently large engagement portion EA.

In the embodiments according to FIG. 2a-d and FIG. 2f-g, the complementary engagement portions EA of the transport units 3A, 3B overlap in the direction of movement BR, and the transport units 3A, 3B overlap completely in the direction normal to the direction of movement BR, here in the Y direction, such that the side edges are aligned. In the example in FIG. 2e, the transport units 3A, 3B each have a substantially cross-shaped base. As a result, not only is one engagement position possible, but rather various engagement positions can be achieved, as is shown, for example, in FIG. 3a+b. Here, the engagement portions EA overlap with one another in the direction of movement BR (corresponds to the X direction), and the transport units 3A, 3B also partially overlap with one another in the direction normal to the direction of movement BR, here in the Y direction. In contrast to the other embodiments, the transport units 3A, 3B overlap with one another here in the Y direction only partially, i.e., they are offset from one another.

In the embodiment according to FIG. 2f, the complementary engagement portions EA are designed to be substantially concave/convex, and, in the engagement position, a certain amount of play S is provided between the engagement portions EA transversely to the direction of movement BR. As a result, a certain amount of relative movement between the transport units 3A, 3B is possible even if the transport units 3A, 3B are jointly moved in the engagement position, as a result of which, for example, serpentine movement patterns can be carried out. In general, two transport units 3i in the engagement position do not have to touch, but rather it is sufficient if they are close enough to one another that the condition is met whereby the total extent in the direction of movement is smaller than the sum of the individual transport-unit extents in the direction of movement.

In each case, three transport units 3A, 3B, 3C are shown in two different engagement positions in FIG. 3a+3b. In FIG. 3a, the direction of movement BR extends obliquely to the X direction and the Y direction, In FIG. 3b, the direction of movement extends in the X direction. In both cases, the complementary engagement portions EA of each two transport units 3A+3B, 3B+3C overlap with one another in the direction of movement such that the total extent of all transport units 3A-3C in the direction of movement is smaller than the sum of the respective transport-unit extents LTEA-LTEC of the transport units 3A-3C. FIG. 3c shows an example alternative of complementary engagement portions EA of two transport units 3A, 3B which overlap with one another not only in the direction of movement BR but also in a vertical direction normal to the transport plane TE, here in the Z direction. As a result, for example, a rectangular or square base can still be realized. Of course, the various alternatives could also be combined, for example by the embodiments of the complementary engagement portions EA shown in FIG. 2a-2e additionally overlapping with one another in the vertical direction, resulting in substantially three-dimensional overlapping in three directions normal to one another.

Figure 3B:
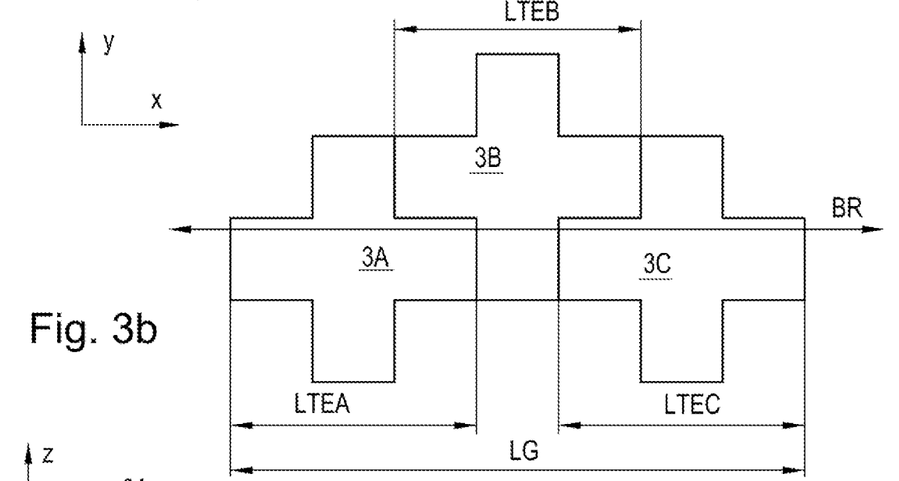
Figure 3C:
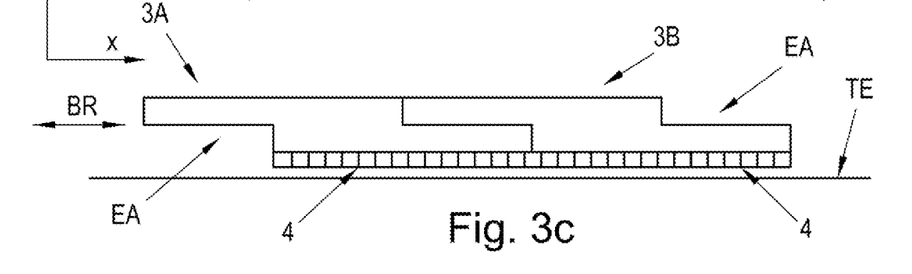
FIG. 3c shows two transport units in an engagement position in a side view.

In the example according to FIG. 3b, it can be seen that the transport unit 3B in the engagement position has an offset from the two other transport units 3A, 3C transversely to the direction of movement BR, here in the Y direction. The transport units 3A-3O can therefore be moved partially side by side in the transverse direction and do not have to be aligned, as is the case, for example, with the embodiment in FIG. 1a. In general, transport units 3i can thus also be moved so as to be offset from one another transversely to the direction of movement BR. This results in greater flexibility, in particular compared with known transport devices in the form of a long-stator linear motor. For example, the transport units 3A-3C can be jointly moved in the engagement position shown in FIG. 3b in the direction of movement BR, and, during the common movement in the direction of movement BR (or also when stationary), individual transport units 3i can be moved out of the engagement position in the transverse direction. In an analogous manner, during the movement of the transport units 3A-3C in the direction of movement BR, one or more further transport units 3i could be moved in the transverse direction into an engagement position with the transport units 3A-3C.

Figure 4:
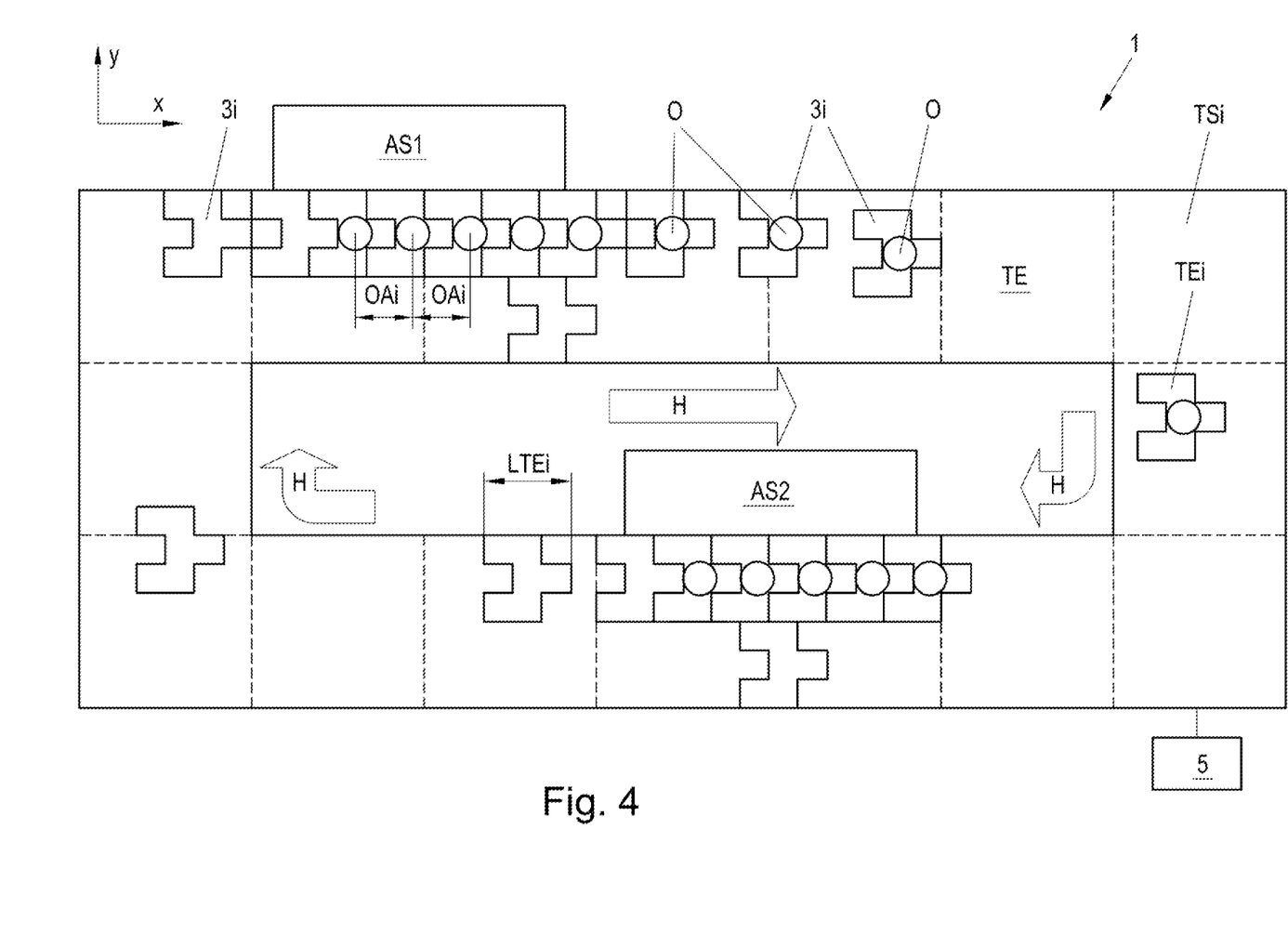
FIG. 4 shows a transport device for carrying out a transport process in plan view.

FIG. 4 shows a transport device 1 in the form of a planar motor in plan view. A plurality of transport segments TSI are assembled in a ring, resulting in a ring-shaped transport plane TE with a central free space. In the transport plane TE, a large number of transport units 3i are arranged which can be moved at least in two dimensions in the transport plane TE independently of one another in order to each transport an object O. No objects O are arranged on some transport units 3i because, for example, they have not yet been loaded or have already been unloaded. The movement of the transport units 3i is controlled in a known manner via a planar motor control unit 5, which controls the drive coils 6 of the transport segments TSi. In the transport device 1, two work stations AS1, AS2 are arranged, in each of which a specific work process is carried out on the transported objects O. Depending on the production process, various work processes are conceivable.

For example, the objects O could be containers that are filled in a work station AS1. The so objects O could also be products on which a specific mechanical processing step is carried out in a work station AS1. As mentioned at the outset, there is usually a main process flow direction in which the largest possible throughput of objects O is desirable. The main process flow direction extends here along a closed loop parallel to the work stations AS1, AS2, as indicated by the arrows. In the region of the work stations AS1, AS2, it may be desired, for example, for as many objects O as possible to be moved in close succession. The aim is therefore to minimize the average object distance CAM. The previously known transport unit design having a square base was limiting because the minimum average object distance OAM was substantially the length of a transport unit. With the design of the transport units 3i according to the invention, the average object distance OAM of transport units 3i moving in succession can now be significantly reduced despite the transport-unit extent remaining the same, because the transport units 3i partially overlap at least in the direction of movement BR (which corresponds to the main process flow direction here).

As can be seen in FIG. 4, in the region of the work stations AS1, a plurality of transport units 3i are brought into an engagement position AS2 in which the engagement portions EA, which are complementary here, of successive transport units 3i overlap with one another in the direction of movement BR. In this engagement position, the transport units 3i can then be jointly moved in the direction of movement BR through the region of the work stations AS1, AS2, it being possible to carry out the corresponding work process on each of the objects. Upstream and downstream of the work stations AS1, AS2, the transport units $3i$ can be released from the engagement position again and the object distance OAi from the transport unit $3i$ traveling therebehind in the direction of movement BR can be increased again, e.g., because the object distance OA does not play a significant role outside of the work station. For example, the transport units $3i$ could be moved through the work stations AS1, AS2 at a relatively low speed in the engagement position in order to have sufficient time to carry out the work process.

After the end of the work process on the foremost transport unit $3i$, said unit can be accelerated individually in order to reach the next work station ASi or an unloading station as quickly as possible. As can be seen in FIG. 4, it is also possible for individual transport units $3i$ to overtake the transport units $3i$ located in the engagement position in the region of the work stations ASi. It would also be possible for a transport unit $3i$ to be moved out of the engagement position transversely to the direction of movement BR, for example in order to eject defective objects O from the work process. As a result, significantly more flexible transport processes can be achieved, in particular compared with a known transport devices in the form of a long-stator linear motor, in which the transport units are moved in succession only in one direction. The transport units $3i$ are of identical design here and correspond to the embodiment shown in FIG. 2a. Of course, other shapes could also be used or different embodiments could be combined.

Figure 5:
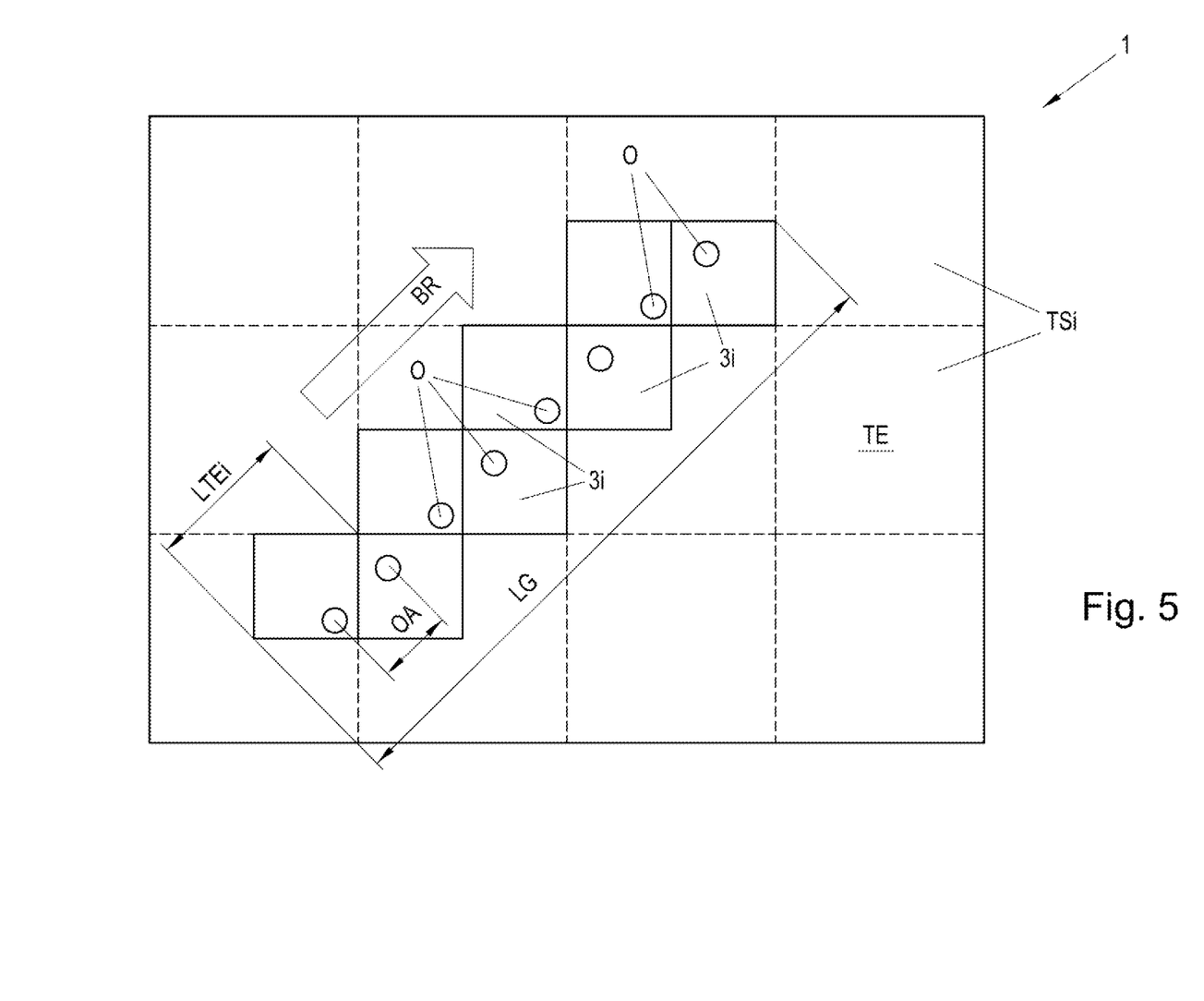
FIG. 5 shows a transport device in plan view to illustrate the method according to the invention.

FIG. 5 shows a transport device 1, with reference to which a method according to the invention for operating the transport device 1 is described below. The transport device 1 has a plurality of transport segments TSI which jointly form a closed transport plane TE. Eight transport units $3i$, each having a square base, are arranged in the transport plane TE here. However, the transport units $3i$ could also have a base with any other shape. The transport units $3i$ also do not have to be of identical design but could have different shapes. The transport device 1 is controlled by at least one planar motor control unit (not shown) or a higher-level control unit. An object O to be transported is arranged on each transport unit $3i$. According to the invention, the transport units $3i$ are moved in succession in the transport plane TE in a direction of movement BR in such a way that they overlap with one another at least in the direction of movement BR such that a total extent LG of the transport units $3i$ in the direction of movement BR is smaller than a sum of the individual transport-unit extents LTEi of the transport units $3i$ in the direction of movement BR. By means of the control according to the invention of the transport units $3i$, the average object distance OAM can also be reduced for transport units $3i$ without complementary engagement portions EA.

The objects O are advantageously positioned on the transport units $3i$ such that an average object distance OAM between the objects O in the direction of movement BR is at most the average transport-unit extent LTEm of the transport units $3i$ in the direction of movement BR. However, the average object distance OAM is preferably at most two thirds of the average transport-unit extent LTEm. It is particularly advantageous if the transport units $3i$ are arranged relative to one another and the objects O are arranged relative to the transport units $3i$ such that the objects O lie on a straight line in the direction of movement BR. As a result, for example, a constant distance between the objects O and a work station can be achieved transversely to the direction of movement BR. It is particularly advantageous here if the objects O are positioned such that the average object distance OAM corresponds to at most half the average transport-unit extent LTEm of the transport units $3i$ in the direction of movement BR.

Figure 6:
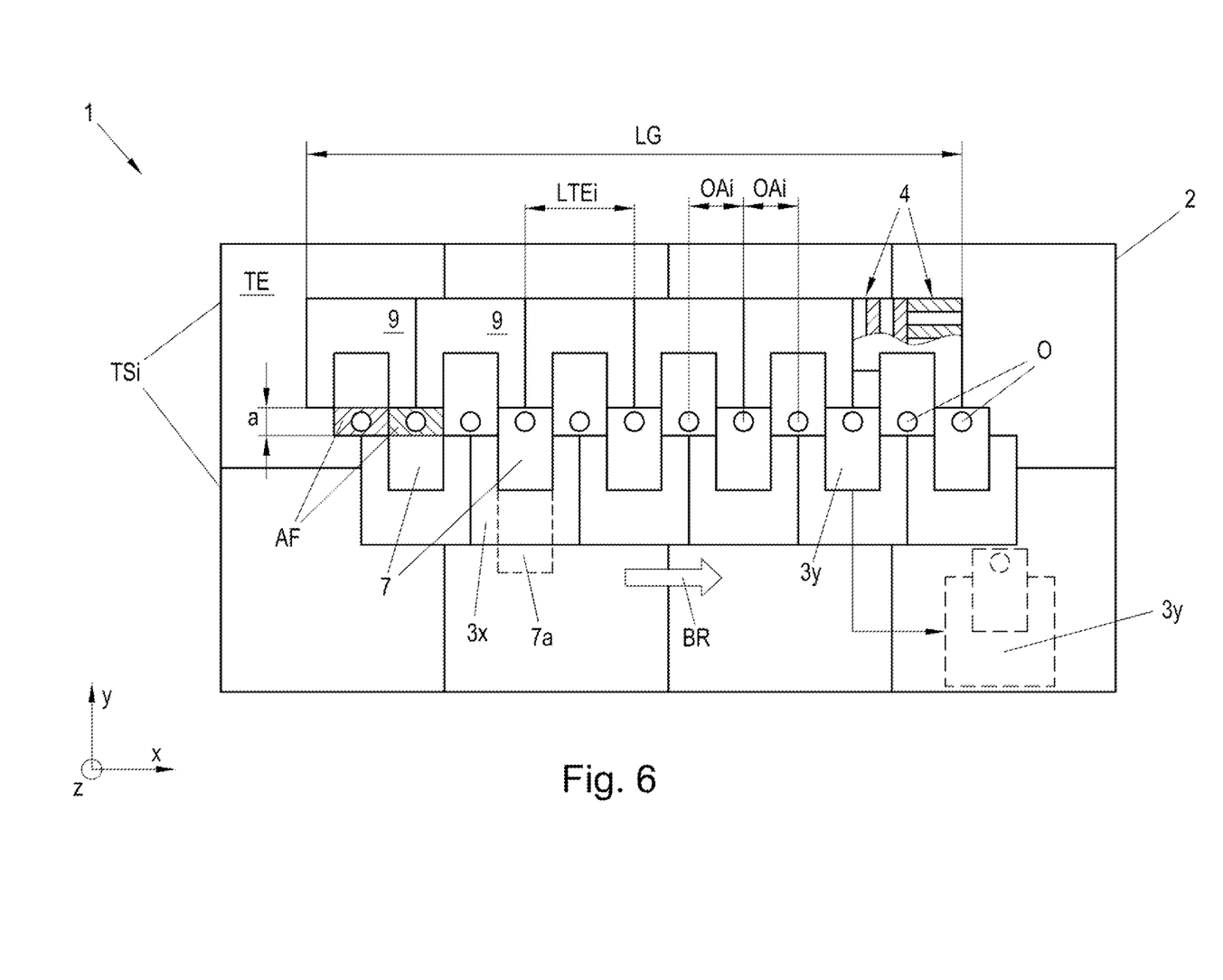
FIG. 6 shows a transport device in an alternative embodiment in plan view.

A further advantageous embodiment of a transport device 1 is shown in FIG. 6. The stator 2 is here in turn formed by a plurality of transport segments TSi which are mutually adjacent in order to jointly form a transport plane TE. In the transport plane TE, a plurality of transport units $3i$ are arranged which can be moved at least in two dimensions in the transport plane TE independently of one another. The transport device 1, in particular the movement of the transport units $3i$, is in turn controlled by at least one planar motor control unit (not shown) or a higher-level control unit. The transport units $3i$ are of identical design here, and each have a main body 9 having a square base. Of course, this is only an example and different transport units $3i$ having different shapes could also be provided. Drive magnets 4 are arranged in a known manner in each case on the underside of the main body 9 facing the transport plane TE, as indicated on the transport unit $3i$ in FIG. 6 at the top right (main body shown partially broken away). The drive magnets 4 interact with drive coils (not shown) of the stator 2 in order to move the transport units $3i$. The drive magnets 4 are arranged here on the transport unit in the known 1D arrangement, but of course a 2D arrangement would also be possible, as shown in FIG. 1a.

On the upper side of the main body 9 of each transport unit $3i$, which upper side is opposite the drive magnet 4, an object carrier 7 is arranged, which is part of the relevant transport unit $3i$. The object carrier 7 here has a rectangular base and extends laterally beyond the base of the main body 9 by an overhang length a. As a result, an overhang surface AF projected onto the transport plane TE is formed, as is indicated by way of example by the hatched regions on two transport units $3i$. As a result, the transport units $3i$, as shown, can be moved in succession in a direction of movement BR (here in the X direction) in such a way that two transport units $3i$ (here alternately an upper and a lower transport unit $3i$) that are successive in the direction of movement BR overlap with one another in the direction of movement BR and also transversely to the direction of movement BR (here in the Y direction) such that a total extent LG of the transport units $3i$ in the direction of movement BR is smaller than a sum of the individual transport-unit extents LTEi of the transport units $3i$ in the direction of movement BR.

In the shown formation of the transport units $3i$, the main bodies 9 of two transport units $3i$ that are successive in the direction of movement BR (here alternately an upper and a lower transport unit $3i$) are spaced apart in the Y direction by the overhang length a. The overhang length a is therefore the distance by which the two transport units $3i$ overlap with one another in the Y direction. However, the distance in the Y direction could in principle also be reduced even further such that the main bodies 9 are directly mutually adjacent in the Y direction and the overhang surface AF of the object carrier 7 of one transport unit $3i$ additionally overlaps the main body 9 of the other transport unit $3i$ in the Z direction, In the example shown, an object O is transported by means of each transport unit $3i$, which object is arranged on the object carrier 7 in the region of the overhang surface AF. The average object distance OAM between the objects O in the direction of movement BR is therefore smaller than the average transport-unit extent LTEi of the transport units $3i$ in the direction of movement BR. Due to the arrangement of an object carrier 7 on a transport unit 3*i* with a rectangular or square base, an engagement portion EA can be produced in a simple manner without having to change the shape of the main body.

The embodiment shown is also advantageous because one or more transport units 3*i* can be ejected from the engagement position in a simple manner. For example, the transport unit 3*y* can be moved out of the engagement position in the Y direction and then moved further as desired in the transport plane TE, as indicated by the arrow and the dashed transport unit 3*y*. As a result, defective objects O can be removed from a production process, for example. The ejection can take place when the transport units 3*i* are stationary or while they are moving. This also makes it possible to reintroduce the transport unit 3*i* at the same position or at a different position, for example in order to repeat a specific work process.

Of course, any other alternatives would also be possible in the example shown. For example, a further object carrier 7*a* could be arranged on one or more transport units 3*i*, for example on the opposite side of a transport unit 3*x*, as indicated by dashed lines in FIG. 6. For example, in this case the two object carriers 7, 7*a* could be formed by a single long object carrier which protrudes beyond the main body 9 on the opposite sides. Of course, an engagement portion EA could instead also be provided on one of the transport units 3*i* in FIG. 6, as shown with reference to FIG. 1*a*-2*g*. From this, it can be seen that the transport device 1 according to the invention can be used to increase the flexibility of a transport process compared with conventional transport devices.

In particular, compared with known linear transport devices such as long stator linear motors, a significant improvement is possible because the reduction in the average object distance OAM is not limited to a fixed direction of movement. In particular due to the possibility of movement of the transport units 3*i* of a transport device 1 in the form of a planar motor in two dimensions, the overlapping according to the invention can be used in an advantageous manner in any direction of movement BR in order to reduce the object distance OAM and thereby increase the object throughput in this direction.

The invention claimed is:

1. A transport device in the form of a planar motor comprising at least one transport segment which forms a transport plane and comprising at least two transport units which can be moved at least in two dimensions in the transport plane, drive coils or movable permanent magnets being arranged on the transport segment and drive magnets being arranged on the transport units, or vice versa, the drive coils or the movable permanent magnets interacting magnetically with the drive magnets in order to move the transport units, at least one engagement portion being provided on each of the at least two transport units, the at least two transport units being movable in succession in the transport plane in a direction of movement into an engagement position in which the engagement portions of the transport units are at least partially engaged, the engagement portions being designed to overlap with one another in the engagement position at least in the direction of movement such that a total extent of the transport units in the direction of movement is smaller than a sum of the individual transport-unit extents of the transport units in the direction of movement, wherein at least two engagement portions are provided on at least one of the at least two transport units, the engagement portions being arranged on opposite sides of the respective transport unit, and wherein the transport units can be moved in the transport plane independently of one another.

2. The transport device according to claim 1, wherein the engagement portions are designed to overlap with one another in the engagement position in a direction normal to the transport plane.

3. The transport device according to claim 1, wherein the engagement portions of the transport units are of complementary design.

4. The transport device according to claim 1, wherein the at least two transport units each have a base projected onto the transport plane with a rectangular area minimally surrounding the base, the minimally surrounding rectangular areas of the at least two transport units overlapping in the engagement position.

5. The transport device according to claim 4, wherein a ratio between the minimally surrounding rectangular area and the base of each transport unit is a maximum of two, preferably a maximum of 1.5 and/or wherein a ratio between the minimally surrounding rectangular area and the base of each transport unit is at least 1.1.

6. A transport unit for use for a transport device according to claim 1, of a at least one engagement portion is provided on the transport unit, which engagement portion being designed to be at least partially engaged with an engagement portion of a further transport unit when the transport unit and the further transport unit are moved in succession in the transport plane in a direction of movement into an engagement position, the engagement portion of the transport unit being designed to overlap with the engagement portion of the further transport unit in the engagement position with the further transport unit at least in the direction of movement, such that a total extent of the transport units in the direction of movement is smaller than a sum of the individual transport-unit extents of the transport units in the direction of movement, wherein at least two engagement portions are provided on the transport unit, the engagement portions being arranged on opposite sides of the transport unit, and wherein the transport unit, outside of the engagement position, can be moved at least in two dimensions in the transport plane of the transport device independently of the other transport unit.

7. The transport unit according to claim 6, wherein the engagement portions are designed to overlap with the further transport unit in the engagement position in a direction normal to the transport plane.

8. The transport unit according to claim 6, wherein the at least two engagement portions are of similar or complementary design.

9. The transport unit according to claim 6, wherein the transport unit has a projected base with a rectangular area minimally surrounding the base, the minimally surrounding rectangular area of the transport unit overlapping with the minimally surrounding rectangular area of a further transport unit in the engagement position with the further transport unit.

10. The transport unit according to claim 9, wherein a ratio between the minimally surrounding rectangular area and the base of the transport unit is a maximum of two, preferably a maximum of 1.5 and preferably a minimum of 1.1.

11. A method for operating a transport device according to claim 1, wherein the at least two transport units are moved in the transport plane independently of one another and wherein the transport units are moved in succession in the transport plane in a direction of movement in such a way that they overlap with one another at least in the direction of movement such that a total extent of the transport units in the direction of movement is smaller than a sum of the individual transport-unit extents of the transport units in the direction of movement.

12. The method according to claim 11, wherein at least three transport units are moved in succession in the transport plane in a direction of movement in such a way that two successive transport units overlap with one another at least in the direction of movement such that a total extent of the transport units in the direction of movement is smaller than a sum of the individual transport-unit extents of the transport units in the direction of movement, each of the at least three transport units transporting an object, the objects being positioned on the transport units such that an average object distance between the objects in the direction of movement corresponds to at most the average transport-unit extent of the at least three transport units in the direction of movement, preferably at most two thirds of the average transport-unit extent.

13. The method according to claim 12, wherein the transport units are positioned relative to one another and the objects are arranged relative to the transport units such that the objects lie on a straight line in the direction of movement.

14. The method according to claim 11, wherein at least two transport units are moved so as to be offset from one another transversely to the direction of movement.

15. The transport device according to claim 1, wherein the at least two engagement portions of the at least one transport unit are of similar or complementary design.

* * * * *